J. F. MORGAL.
CUTTING AND DISTRIBUTING DEVICE FOR SILO FILLERS.
APPLICATION FILED MAR. 22, 1920.

1,353,261. Patented Sept. 21, 1920.

INVENTOR.
J. F. MORGAL
BY
ATTORNEY.

UNITED STATES PATENT OFFICE.

JOHN F. MORGAL, OF SPRINGFIELD, OHIO, ASSIGNOR TO THE E. W. ROSS COMPANY, OF SPRINGFIELD, OHIO, A CORPORATION OF OHIO.

CUTTING AND DISTRIBUTING DEVICE FOR SILO-FILLERS.

1,353,261.    Specification of Letters Patent.    Patented Sept. 21, 1920.

Application filed March 22, 1920. Serial No. 367,742.

*To all whom it may concern:*

Be it known that I, JOHN F. MORGAL, a citizen of the United States, residing at Springfield, in the county of Clark and State of Ohio, have invented certain new and useful Improvements in Cutting and Distributing Devices for Silo-Fillers, of which the following is a specification, reference being had therein to the accompanying drawing.

This invention relates to a cutting and distributing device for silo fillers and the like. Devices of this kind as ordinarily employed comprise a rotary supporting member or wheel which is mounted in a suitable housing and provided with knives for cutting and shredding the ensilage and which is also provided with fan blades for elevating and blowing the ensilage through the delivery chute after it has been cut.

One object of the invention is to provide such a device which will be simple in its construction, of a strong, durable character, and which can be produced at a relatively low cost.

A further object of the invention is to form such a device with a body portion of sheet metal and to provide means for rigidly securing the elevating fan blades and cutters thereto.

Other objects of the invention will appear as the device is described in detail.

Figure 2:
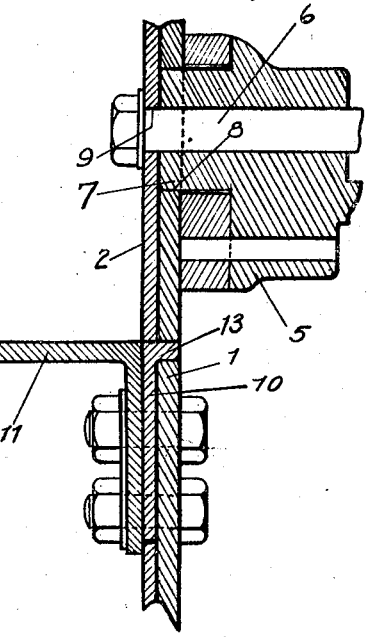
Figure 1:
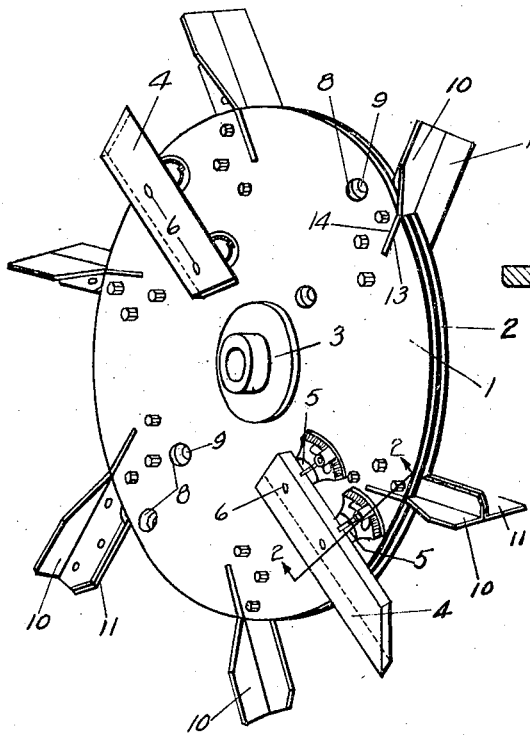
Figure 3:
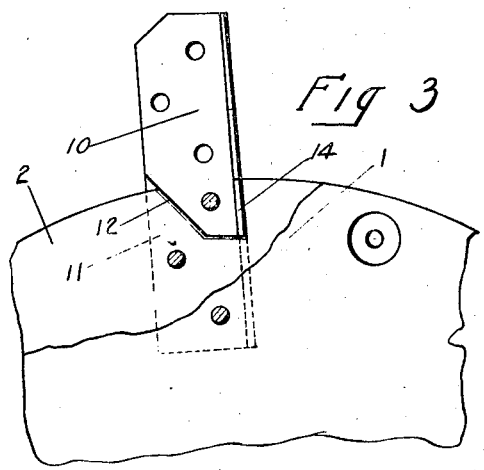

In the accompanying drawings, Figure 1 is a perspective view of a device embodying my invention; Fig. 2 is a section taken on the line 2—2 of Fig. 1; and Fig. 3 is a side elevation of a portion of the rotary supporting member, partly broken away to show the manner of attaching the distributing blades thereto.

In these drawings I have illustrated one embodiment of my invention but it will be understood that this particular embodiment of the invention has been chosen for the purpose of illustration only and that the device may take various forms without departing from the spirit of the invention. In that particular form of the device here shown it comprises a rotary supporting member which is preferably made of sheet metal, such as boiler plate, and which, as here shown, comprises two flat disk-like members 1 and 2 arranged face to face and rigidly connected one to the other. These members are supported at their inner ends on a hub casting 3 by means of which they are attached to the supporting shaft, which is not here shown. Mounted upon one face of the rotary supporting member are a plurality of cutting knives 4, there being in the present instance two knives and provision being made for two more, but it will be understood that any suitable number of knives may be employed, and further that the knives may be either plain cutting knives or shredders. These knives are attached to the face of the supporting member by suitable attaching devices, or saddles, 5 which form no part of the present invention and need not be described in detail. Suffice it to say that each knife support, or saddle, is secured to the supporting member by means of a bolt 6 which passes through the supporting member. In order that the bolt may be relieved of the strain which would otherwise be imposed thereon by the action of the knives, I have provided the rotary supporting member, or wheel, with a socket into which projects a boss 7 forming part of the knife support, or saddle. As here shown the disk 1 of the rotary supporting member is provided with an aperture 8 of such a size that the end of the boss 7 will fit snugly therein and the second disk 2 of the rotary supporting member is provided with an aperture 9, smaller than the aperture 8 and adapted to receive the bolt by means of which the knife support, or saddle, is attached to the rotary supporting member.

The rotary supporting member is provided about its periphery with a series of fan blades which project beyond the edge thereof and which, when the device is mounted in the usual housing, which is not here shown, serve to blow, or throw, the ensilage, or other material which has been cut, or shredded, through a discharge conduit. These fan blades also act directly upon the cut material with a throwing action to facilitate the discharge thereof into the conduit and to this end they are here shown as set slightly off-radius. Preferably each fan blade is made up of two angle irons 10 and 11 which are arranged with two of their flanges in a common plane, to form the face of the blade, and with the other two flanges arranged face to face and rigidly connected one to the other, and forming a rearwardly projecting rib extending longitudinally of the blade between the edges thereof. It has been proposed heretofore to employ angle irons to form these blades but they have been mounted upon opposite sides of the rotary supporting member and a filler block interposed between the parallel flanges thereof. This results in the formation of two joints where the present construction results in the formation of a single joint. The use of a single joint is of a decided advantage in a device of this kind because finely cut material, dust and the like will work its way into the joint and gradually spread the same apart and the use of a fan blade having a single joint instead of two joints reduces this action by half. The angle iron 11, which is arranged on that side of the rotary member opposite the knives 4, extends inwardly for some distance beyond the periphery of the supporting member and may be rigidly secured thereto by means of bolts, or rivets, but the angle iron 10 can not project beyond the periphery of the supporting member as this would cause it to come in contact with the material to be cut as the latter is fed across the cutter bar into the path of the cutter, and consequently, I have shown the angle iron 10 of less length than the angle iron 11. It is not desirable to rely wholly upon the connection between the two angle irons for the support of the angle iron 10 and I have therefore shown this angle iron and the supporting structure as provided with parts which coöperate to support the angle iron and to brace the same against displacement in the operation of the device. Preferably this supporting member is provided with a peripheral recess in which a part of the angle iron 10 fits and in which it is rigidly held. As here shown, the disk 2 of the supporting member is provided with a notch 12, the rear wall of which is preferably inclined to the radius of the supporting member and the inner end of the rearwardly projecting flange of the angle iron 10 is shaped to fit within this notch. The shape of the notch is such as to provide a relatively long contact surface between the supporting member and the angle iron extending transversely to the line of movement of the blade as a whole, thus strongly bracing the angle iron 10. It will be noted that the notch 12 is formed only in the disk 2, and consequently, when the angle iron 10 is in position therein the inner portion thereof is confined between the angle iron 11 and the disk 1. Further this portion of the angle iron extends into the disk far enough to receive one of the bolts or rivets, by means of which the fan blade is attached to the disk. The disk 1 is provided with a slot 13 into which the transverse flange of the angle iron 10 extends, as shown at 14, that part of the flange which lies within the periphery of the supporting member being cut away so that the edge of the flange will not project beyond the face of the disk, thus providing an additional supporting contact between the angle iron 10 and the disk 1. It will be apparent that this method of connecting the fan blade to the supporting member not only provides a very strong rigid connection between the fan blade and the supporting member but is of such a character that the fan blades can be quickly and easily attached to the supporting structure or removed therefrom. To attach the fan blade it is only necessary to insert the angle iron 10 in the notch 12 and slot 13 and to then apply the bolts, or rivets, which attach the fan blade to the supporting member.

The construction herein described enables the supporting member to be made of boiler plate, or similar material, which has much greater strength than does the cast iron from which the supporting members are usually made, and by making the supporting member of two disks these can be easily formed from sheet metal and the proper opening formed therein by punching, thus enabling the device to be manufactured at a comparatively low cost.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a device of the character described, a rotary supporting member, and a fan blade comprising two angle irons having two of their flanges arranged face to face and rigidly connected directly one to the other, one of said angle irons extending beyond the other and rigidly secured to said supporting member.

2. In a device of the character described, a rotary supporting member, and a fan blade comprising two angle irons having two of their flanges arranged face to face and rigidly connected directly one to the other, one of said angle irons extending beyond the other and rigidly secured to said supporting member, the other angle iron and said supporting member having coöperating parts to reinforce said other angle iron.

3. In a device of the character described, a rotary supporting member, a blade comprising two angle irons having two of their flanges in contact face to face and rigidly connected directly one to the other, and means for securing said blade to said supporting member with the other flanges of said angle irons extending on opposite sides of the plane of said supporting member.

4. In a device of the character described, a rotary supporting member having a slot in the periphery thereof, and a fan blade having a longitudinal rib extending rearwardly therefrom between the edges thereof, one edge of said blade being seated in said slot and said rib being rigidly secured to said supporting structure.

5. In a device of the character described, a rotary supporting member having a slot in the periphery thereof, and a blade having a longitudinal rib extending rearwardly therefrom between the edges thereof and rigidly secured to said supporting member, one edge of said blade being seated in said slot and having that portion extending into the slot of less width than the outer portion thereof.

6. In a device of the character described, a rotary supporting member having a peripheral notch in one side thereof and a fan blade comprising two angle irons rigidly connected one to the other, one of said angle irons being of greater length than the other and being rigidly secured to said supporting member, and the other of said angle irons having a part extending into said notch.

7. In a device of the character described, a rotary supporting member having a transverse peripheral slot extending through the entire thickness thereof, and having in one side thereof a notch extending rearwardly from said slot, and a fan blade comprising two angle irons rigidly connected one to the other, one of said angle irons being rigidly secured to said supporting member and the other of said angle irons having its flanges extending respectively into said slot and into said notch.

8. In a device of the character described, a rotary supporting member comprising two disks of substantially equal diameter rigidly connected one to the other, said supporting member having a plurality of seats arranged about the periphery thereof, fan blades seated in the respective seats and each having a part overlapping the face of said supporting member, and means for rigidly securing said parts of said fan blades to said supporting member.

9. In a device of the character described, a rotary supporting member comprising two disks rigidly connected one to the other, one of said disks having a peripheral notch therein, and a fan blade comprising two angle irons rigidly connected one to the other, one of said angle irons being rigidly secured to that disk having the notch therein, and the other angle iron having one of its flanges extending into said notch and confined between the first mentioned angle iron and the other disk.

10. In a device of the character described, a rotary supporting member comprising two disks rigidly connected one to the other, one of said disks having a peripheral notch and the other of said disks having a peripheral slot arranged in line with said notch, and a fan blade comprising two angle irons rigidly secured one to the other, one of said angle irons being rigidly secured to that disk having the notch therein and the other angle iron having one flange extending into said slot and having the other flange arranged in said notch between the last mentioned disk and the first mentioned angle iron.

11. In a device of the character described, a rotary supporting member comprising two disks rigidly connected one to the other, one of said disks having a peripheral notch therein and the other of said disks having a peripheral slot in line with said notch, and a fan blade comprising two angle irons rigidly connected one to the other, one of said angle irons being of greater length than the other and being rigidly secured to said supporting member in contact with that disk having the notch therein, the shorter of said angle irons having its flanges shaped to fit respectively into the notch in the one disk and into the slot in the other disk, and a bolt extending through that portion of the last mentioned angle iron which is seated in said notch.

12. In a device of the character described, a rotary supporting member comprising two flat sheet metal disks rigidly connected one to the other, one of said disks having an aperture therein to receive a part of a knife supporting device and the other of said disks having a smaller aperture arranged in line with the first mentioned aperture to receive the bolt by means of which said knife supporting device is attached to said supporting member.

In testimony whereof I affix my signature hereto.

JOHN F. MORGAL.